United States Patent [19]

Miyakawa et al.

[11] 4,199,413
[45] Apr. 22, 1980

[54] ELECTRIC RECORDING MATERIAL AND ELECTRIC RECORDING PROCESS

[75] Inventors: Nobuhiro Miyakawa, Kobe; Hiroshi Kokado; Eiichi Inoue, both of Tokyo, all of Japan

[73] Assignee: Mita Industrial Company Limited, Osaka, Japan

[21] Appl. No.: 6,021

[22] Filed: Jan. 24, 1979

Related U.S. Application Data

[63] Continuation of Ser. No. 766,754, Feb. 8, 1977, abandoned.

[30] Foreign Application Priority Data

Feb. 19, 1977 [JP] Japan .................................. 52/16514

[51] Int. Cl.² ...................... G01D 15/06; G01D 15/34
[52] U.S. Cl. .............................................. 204/2
[58] Field of Search ............................................. 204/2

[56] References Cited

U.S. PATENT DOCUMENTS

| | | | |
|---|---|---|---|
| 3,122,488 | 2/1964 | Mandel | 204/2 |
| 3,122,489 | 2/1964 | Mandel | 204/2 |
| 3,216,855 | 11/1965 | Ellison | 204/2 |
| 3,575,821 | 4/1971 | Diamond | 204/2 |
| 3,589,985 | 6/1971 | Barnes | 204/2 |
| 3,668,079 | 6/1972 | Diamond | 204/2 |
| 3,875,023 | 4/1975 | Sekine | 204/2 |

Primary Examiner—T. M. Tufariello
Attorney, Agent, or Firm—Sherman & Shalloway

[57] ABSTRACT

An electric recording material comprising a support and an electrically conductive recording layer formed at least in the surface portion of the substrate, which recording layer is composed of a dispersion of a basic salt of divalent tin or tin (II) hydroxide in an electrically conductive medium, gives an image having high density and contrast at relatively low electric power when applied to an electrolytic recording process utilizing cathodic reduction. This image can be preserved for a long time without discoloration of the background. Especially good results are obtained when a specific polyhydric alcohol is incorporated in the recording layer optionally with a specific organic sulfur compound. This recording material is effectively applied to an electric recording process comprising electrically connecting this recording material between a cathode stylus and a counter anode so that the recording layer falls in contact with the cathode stylus, moving the cathode stylus and recording material relatively to scan the cathode stylus over the surface of the recording layer, and simultaneously applying electric signals between the cathode stylus and counter anode to form a visible image on the recording layer.

8 Claims, 4 Drawing Figures

ELECTRIC RECORDING MATERIAL AND ELECTRIC RECORDING PROCESS

This is a continuation of application Ser. No. 766,754, filed Feb. 8, 1977, now abandoned.

BACKGROUND OF THE INVENTION (1) Field of the Invention

The present invention relates to an electric recording material and an electric recording process. More particularly, the invention relates to an electric recording material comprising a substrate and an electrically conductive layer formed at least in the surface portion of said substrate, said electrically conductive layer containing a basic salt of divalent tin or tin (II) hydroxide dispersed in an electrically conductive medium, and to an electric recording process using this electric recording material.

(2) Description of the Prior Art

As the conventional electric recording process, there are known (A) an electrolytic recording process comprising injecting hetero ions into a recording material, (B) an electrolytic recording process utilizing discharge of ions at an electrode falling in contact with a recording material, (C) an electrolytic recording process utilizing oxidation (anode oxidation) or reduction (cathodic reduction) on the surface of an electrode falling in contact with a recording material, (D) a recording process utilizing local change of the pH on the surface of a recording material falling in contact with a recording material, and the like. Among these known processes, the cathodic reduction process is advantageous in that consumption of an electrode stylus to be used for recording can be maintained at a lowest level.

As the electric recording material that can be used for the recording process utilizing cathodic reduction, there are known a recording material formed by coating dispersion of a reducible silver salt such as silver behenate in an electrically conductive medium such as an electrically conductive resin on an appropriate substrate, and a recording material formed by coating a dispersion of 2,3,5-triphenyltetrazonium chloride in an electrically conductive medium on an appropriate substrate. In a recording material of the former type, when the silver salt in the electrically conductive medium falls in contact with a cathode stylus and an electric current is applied thereto, it is reduced and black metallic silver is precipitated to form an image, and in a recording material of the latter type, the tetrazonium in the medium is cathodically reduced to form an image of a formazan dye.

These known recording materials, however, are still insufficient and defectice. For example, in the recording material of the former type, by cathodic reduction metallic silver is precipitated ordinarilly in the form of very fine particles, and therefore, it is difficult to form an image having high contrast and high density. Further, since an expensive silver salt must be used, the cost of the recording material becomes high. In case of the recording material of the latter type, in general, the resulting image is reddish and the image density is low. Further, fastness, e.g., light fastness, is poor and preservability is insufficient.

SUMMARY OF THE INVENTION

We found that when an electrically conductive layer formed by dispersing a basic salt of divalent tin or tin (II) hydroxide, described in detail hereinafter, in a known electrically conductive medium provides an image having a sufficient density and a high contrast with a relatively small electric output when an electric current is applied to this electrically conductive layer under contact with a cathode.

It is therefore a primary object of the present invention to provide a novel electric recording material comprising a basic salt of divalent tin or tin (II) hydroxide as a substance developing a color under reducing conditions.

Another object of the present invention is to provide an electric recording material capable of forming an image having high density and high contrast and good preservability by cathodic reduction.

Still another object of the present invention is to provide a novel electric recording material comprising a cheap and readily available tin compound as a substance developing a color under reducing conditions.

Still another object of the present invention is to provide an electric recording material comprising as a substance developing a color under reducing conditions a composition comprising (A) a basic salt of divalent tin or tin (II) hydroxide, (B) a specific polyhydric alcohol and if desired, (C) a specific organic sulfur compound.

Still another object of the present invention is to provide an electric recording material excellent in the gradient characteristic and the recording efficiency (the height of the image density per unit electric output).

A further object of the present invention is to provide an electric recording process using an electric recording material as mentioned above.

DETAILED DESCRIPTION OF THE PREFERRED EMBODIMENTS

Figure 1:
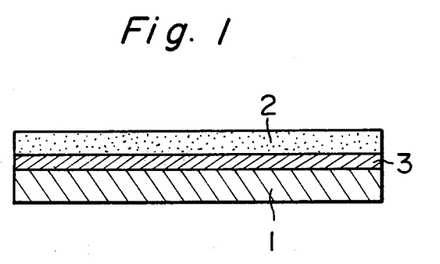
FIG. 1 is a sectional view illustrating the sectional structure of a dry type electric recording material according to the present invention.

A preferred electric recording material of the present invention (a dry type recording material) comprises, as shown in FIG. 1, a substrate 1 and an electrically conductive recording layer 2 formed on at least one surface of the substrate 1. If desired, an electrically conductive layer 3 may be formed between the substrate 1 and the recording layer 2.

Figure 2:
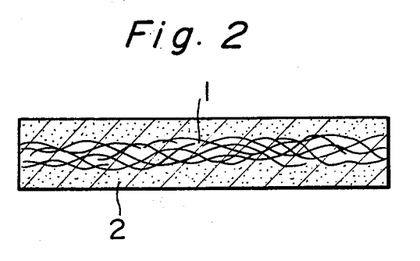
FIG. 2 is a sectional view illustrating the sectional structure of a wet type electric recording material according to the present invention.

Another type (wet type) of the electric recording material of the present invention is illustrated in FIG. 2. This recording material comprises a porous substrate 1 such as paper and an electrically conductive recording medium 2 formed in the porous substrate 2 by impregnation or the like treatment. The surface of the recording material acts as the recording layer.

In the instant specification and claims, by the term "dry type electric recording material" is meant a recording material on which electric recording is possible in the dry state, namely in the state standing in open air, and by the term "wet type electric recording material" is meant a recording material on which electric recording is possible only when it is kept in the wet state. An electric recording material of the type shown in FIG. 1 is suitable for the dry type electric recording and an electric recording material of the type shown in FIG. 2 is suitable for the wet type electric recording.

According to the present invention, the electrically conductive layer 2 is formed from an electrically conductive medium and a basic salt of divalent tin or tin (II) hydroxide dispersed in the electrically conductive medium. In the present invention, in order to form an image having high density and high contrast and being excellent in the preservability by cathodic reduction, it is important that a basic salt of divalent tin or tin (II) hydroxide should be used as the reducible color-forming substance (the substance developing a color under reducing conditions). When an ortho salt of divalent tin such as a tin (II) halide is used, no image is formed at all by cathodic reduction, or even if an image is formed, it is very unstable and disappears immediately. Tin (II) oxide is colored in itself, and it is difficult to attain a sufficient contrast between an image formed by cathodic reduction [namely, an image consisting of metallic tin or a tin oxide having a lower degree of oxidation than that of tin (II) oxide] and the background. In order to attain the foregoing object, it is important that tin in the tin compound used must be divalent. When a tetravalent tin compound is used, either the contrast or density of an image formed by cathodic reduction is low and the preservability of the resulting colored image is extremely bad (the image disappears when it is stored for a long time).

In the present invention, the basis salt is defined as a salt consisting of an acid group and a hydroxyl group or oxygen atom regarded as an anionic component independent from the acid group. The ratio of both the components can be changed in a broad range so as to obtain an image having a desirable combination of the image density and contrast. In general, however, it is preferred to use a basic salt of divalent tin having an oxide compression represented by the following formula:

$$SnO \cdot mSnX_{2/k} \qquad (1)$$

wherein X stands for an acid radical, m is a number larger than 0 but not larger than 5, especially a number in the range of from 0.3 to 2, and k stands for the valence of the acid radical X.

In general, the density of an image formed by cathodic reduction of a tin (II) compound having a value of m greater than 5 is lower than that of an image formed by cathodic reduction of a tin (II) compound having a value of m in the above range.

As the acid radical X, there can be mentioned, for example, halide ions such as fluorine ion, chlorine ion and bromine resin, anions of acidic oxides such as carbonate ion, nitric ion, nitrous ion, sulfuric ion, sulfurous ion, phosphoric ion, phosphorus ion, pyrophosphoric ion, boric ion and silicic ion, and organic anions such as formic ion and acetic ion. In view of the recording efficiency, halide ions, especially chlorine ion, are preferred among them.

The foregoing objects of the present invention can be attained most effectively when tin (II) oxychloride is used as the reducible color-forming substance. The tin (II) oxychloride includes various compounds differing in the composition, and for example, the following compounds are known, though the tin (II) oxychloride that can be used in the present invention is not limited to these compounds:

$SnO \cdot SnCl_2 \cdot 3H_2O$,
$4SnO \cdot SnCl_2 \cdot 6H_2O$,
$3SnO \cdot 2SnCl_2 \cdot 6H_2O$,
$5SnO \cdot 3SnCl_2 \cdot 3H_2O$,
$7Sn(OH)_2 \cdot 2SnCl_2$ and
$3Sn(OH)_2 \cdot SnCl_2$.

These compounds may be used singly or in the form of a mixture of two or more of them or with tin (II) chloride or tin (II) hydroxide.

These tin (II) oxychlorides, in general, are white or light yellow fine powders and take a crystalline form.

The basic tin (II) salt and tin (II) hydroxide that are used in the present invention can be prepared by (1) boiling an aqueous solution of a water-soluble tin (II) salt such as tin (II) chloride to hydrolyze the salt partially or completely or (2) reacting an aqueous solution of a water-soluble tin (II) salt such as tin (II) chloride with an alkaline agent in an amount not exceeding the equivalent amount to hydrolyze the salt partially or completely. In view of the stability of the formed image, the yield and the operation easiness, the method (2) is preferred.

As the alkaline agent, there are preferably employed hydroxides, carbonates and bicarbonates of alkali metals such as sodium, potassium and lithium, ammonia and ammonium carbonate, and hydroxides, water-soluble carbonates and bicarbonates of alkaline earth metals such as magnesium, calcium, strontium and barium. In view of the density of the formed image, it is preferred that such alkaline agent be used in an amount of 0.2 to 1 equivalent, especially 0.4 to 0.8 equivalent, based on the water-soluble tin (II) salt. If it is desired to prevent discoloration of the background over a long period of time, it is preferred that the alkaline agent be used in an amount of 0.8 to 1 equivalent based on the water-soluble tin (II) salt.

Figure 3:
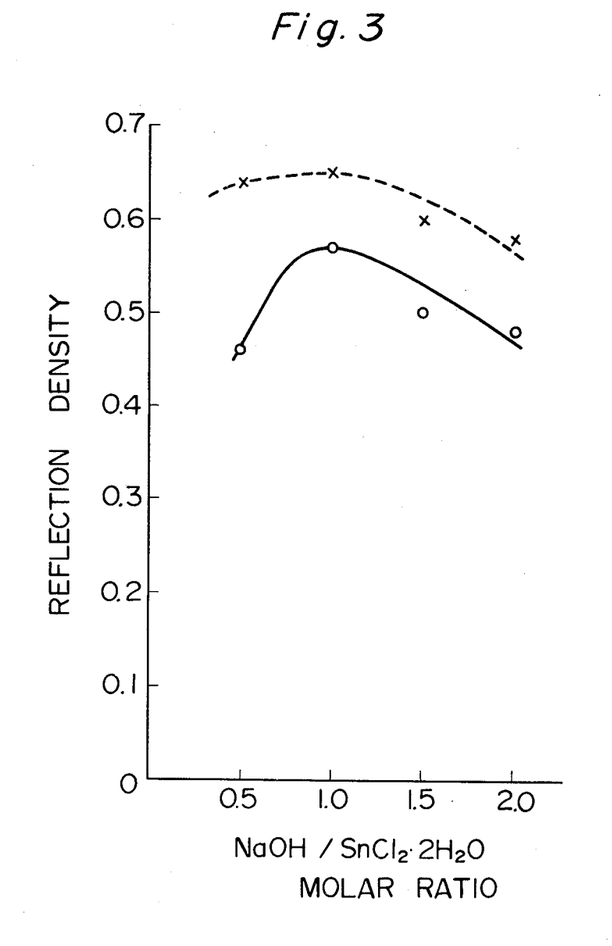
FIG. 3 is a graph illustrating the relation between the molar ratio of an alkaline agent (NaOH) to tin (II) chloride.

FIG. 3 illustrates a relation between the molar ratio of the alkaline agent to the water-soluble tin (II) salt and the density of an image formed on the recording layer by cathodic reduction. From FIG. 3, it will readily be understood that when the alkaline agent is used in an amount of about 0.5 equivalent (namely at a molar ratio of 1:1), the image density can be improved most conspicuously.

Results shown in FIG. 3 are those obtained by preparing recording materials in the same manner as described in Example 1 given hereinafter by using tin oxychlorides formed in the same manner as described in Referential Example 1 given hereinafter while changing the molar ratio of the alkaline agent to stannous chloride and performing electric recording under the same conditions as described in Example 1 by using the so prepared recording materials. In FIG. 3, the solid line (O) shows results obtained when the recording electric power was 1.5 W and the dot line (X) shows results obtained when the recording electric power was 2.9 W.

In conducting the above reaction, generally, a water-soluble tin (II) salt such as a tin (II) halide is dissolved in water to form an aqueous solution having a concentration of 2 to 10 moles per liter, the aqueous solution is mixed with an aqueous solution of an alkaline agent under cooling, for example, at a temperature lower than room temperature, the resulting reaction product is promptly recovered by filtration in 20 minutes from the start of mixing, and the recovered reaction product is washed with distilled water or alcohol. When this reaction is conducted at a high temperature or for a long time, the recording efficiency of the product is low or the background of the recording layer tends to be colored. Therefore, attention must be paid to the reaction time and temperature in conducting the above reaction. The separated and washed basic tin (II) salt or tin (II) hydroxide is used for formation of a recording layer as it is in the as-recovered paste form or after it has been dried.

In order to disperse the so prepared basic tin (II) salt or tin (II) hydroxide uniformly and homogeneously in an electrically conductive medium, it is preferred that the average particle size of the basic tin (II) salt or tin (II) hydroxide be not larger than $3\mu$.

In the present invention, it generally is preferred that the electrically conductive recording layer 2 be characterized by a volume resistivity not higher than $10^8\Omega$-cm, though the preferred volume resistivity varies to some extent depending on whether or not recording layer 2 is formed directly on a conductor. More specifically, when the recording layer 2 is formed on the substrate 1 through an electrically conductive layer or when the substrate 1 is composed of a conductor such as a metal, it is preferred that the volume resistivity of the recording layer 2 be in the range of from $10^3$ to $10^7\Omega$-cm. When the recording layer 2 is formed directly on a non-conductive (highly electrically resistant) substrate 1 such as paper or film, it is preferred that the volume resistivity of the recording layer 2 be in the range of from 10 to $10^6\Omega$-cm. If the volume resistivity of the recording layer 2 is higher than the above range, it is difficult to form a recorded image having a sufficient density, and if it is intended to increase the image density forcibly in such case, such troubles as discharge destruction or so-called "tailing" are readily caused. If the volume resistivity of the recording layer 2 is lower than the above range, so called "bleeding" readily takes place.

In order to control the volume resistivity, i.e., electric resistance, of the recording layer in the above-mentioned range, it is necessary to incorporate an inorganic or organic conducting agent as the medium into the recording layer.

Various organic and inorganic conducting agents, for example, those exemplified below, can be used in the present invention as such conducting agent.

A. Inorganic Conducting Agents:

Potassium chloride, barium chloride, magnesium chloride, zinc chloride, aluminum chloride, ammonium chloride, calcium chloride, potassium bromide, sodium bromide, zinc bromide, aluminum sulfate, magnesium sulfate, potassium sulfate, barium sulfate, sodium sulfate, ammonium sulfate, sodium sulfite, aluminum nitrate, ammonium nitrate, barium nitrate, zinc nitrate, calcium nitrate, sodium nitrate, sodium nitrite, ammonium acetate, potassium acetate, calcium acetate, lead acetate, sodium acetate, ammonium carbonate, potassium carbonate, sodium carbonate, calcium carbonate, sodium ortho-phosphate, cuprous iodide and indium (III) oxide.

B. Organic Conducting Agents:

(1) Cationic Conducting Agents:

(1-a) Amine Type Conducting Agents:

Primary, secondary and tertiary alkylamines, cycloalkylamines and alkanolamine, their acid addition salts with carboxylic acids, phosphoric acid or boric acid, and polyalkyleneimines, amideamines and polyamines and their complex metal salts.

(1-b) Imidazoline Type Conducting Agents: 1-Hydroxyethyl-2-alkylimidazolines and the like.

(1-c) Amine-Ethylene Oxide Adducts and Amine-Propylene Oxide Adducts:

Adducts of ethylene oxide, propylene oxide or other alkylene oxide to mono- or di-alkanolamines, long-chain ($C_{12}$ to $C_{22}$) alkylamines or polyamines.

(1-d) Quaternary Ammonium Salts:

Quaternary ammonium salts represented by the following general formula:

wherein $R_1$ to $R_4$, which may the same or different, stand for an alkyl group with the proviso that at least 2 of $R_1$ to $R_4$ stand for a lower alkyl group and at least one of $R_1$ to $R_4$ stands for an alkyl group having at least 6 carbon atoms, preferably at least 8 carbon atoms, and $X^-$ denotes a halide ion, and quaternary ammonium salts represented by the following general formula:

wherein R stands for an alkyl group having at least 12 carbon atoms, p is 0 or 1, and X stands for a halide ion.

(1-e) Other Cationic Conducting Agents:

Cationic polymers formed by quaternizing polymers of aminoalcohol esters of ethylenically unsaturated carboxylic acids (such as a quaternary ammonium type polymer of diethylaminoethyl methacrylate), acrylamide derivatives (such as a quaternary ammonium type polymer of N,N-diethylaminoethyl acrylamide), vinyl ether derivatives (such as a pyridium salt of polyvinyl-2-chloroethyl ether), nitrogen-containing vinyl derivatives (such as a product formed by quaternizing poly-2-vinylpyridine with p-toluenesulfonic acid), polyamine resins (such as polyethylene glycol polyamine), polyvinylbenzyltrimethyl ammonium chloride, polypyrazines and quaternarized polypyrazines.

(2) Anionic Conducting Agents:

(2-a) Sulfonic Acid Type Conducting Agents:

Alkylsulfonic acids, sulfated oils, and salts of higher alcohol sulfuric acid esters.

(2-b) Carboxylic Acid Type Conducting Agents:

Adipic acid and glutamic acid.

(2-c) Phosphoric Acid Derivative Conducting Agents:

Phosphonic acid, phosphinic acid, phosphite esters and phosphate ester salts.

(2-d) Other Anionic Conducting Agents:

Homopolymers and copolymers of ethylenically unsaturated carboxylic acids (such as polyacrylic acid and copolymers of maleic anhydride with comonomers such as styrene and vinyl acetate), and homopolymers and copolymers of sulfonic acid group-containing vinyl compounds (such as polyvinyltoluenesulfonic acid, polystyrenesulfonic acid and polyvinylphosphonic acid).

(3) Non-Ionic Conducting Agents:

(3-a) Polyether Type Conducting Agents:

Solid polyethers such as polyethylene oxide and polypropylene oxide.

(3-b) Alkylphenol Adduct Type Conducting Agents:

Adducts of ethylene oxide or propylene oxide to alkylphenols.

(3-c) Alcohol Adduct Type Conducting Agents:

Adducts of ethylene oxide or propylene oxide to alcohols (such as a higher alcohol-ethylene oxide adduct).

(3-d) Ester Type Conducting Agents:

Butyl, amyl and glycerin esters of higher fatty acids such as adipic acid and stearic acid.

(3-e) Amide Type Conducting Agents:

Higher fatty acid amides, dialkyl amides, and adducts of ethylene oxide or propylene oxide to these amides.

(3-f) Other Non-Ionic Conducting Agents:

Polyvinyl alcohol, starch and cyanoethylated starch.

Conducting agents exemplified above may be used singly or in the form of a mixture of two or more of them. For example, better results are obtained when inorganic conducting agents are used singly or in combination with organic conducting agents as the electrically conductive medium of a wet type electric recording material as shown in FIG. 2. Further, anionic, cationic or non-ionic polymeric conducting agents are advantageously used singly or in combination with organic conducting agents or low-molecular-weight organic conducting agents as the electrically conductive medium of a dry type electric recording material as shown in FIG. 1. In view of easiness in handling, it is preferred that a dry type recording layer be formed by using a polymeric conducting agent as exemplified above.

The preferred thickness of the electrically conductive recording layer varies depending on the use thereof, namely whether the recording material is of the dry type or the wet type, and on whether or not an electrically conductive layer is additionally formed. In general, however, in case of a recording material of the dry type, it is preferred that the thickness of the electrically conductive recording layer be in the range of 3 to 5$\mu$, especially 5 to 30$\mu$. When the thickness of the recording layer is smaller than 3$\mu$, a sufficient image density cannot be obtained. Even if the thickness of the recording layer is larger than 50$\mu$, no further improvement can be attained but economical disadvantages are brought about. In case of a recording material of the wet type, the preferred thickness of the recording layer is changed depending on the thickness of the porous substrate, but it is ordinarily preferred that the thickness of the recording layer be not larger than 200$\mu$.

The concentration of the above-mentioned tin (II) compound in the electrically conductive recording layer is decided depending on a desired image density. In general, however, it is preferred that the tin (II) compound be incorporated in an amount of 200 to 1000 parts by weight, especially 300 to 700 parts by weight, per 100 parts by weight of the electrically conductive medium. If the amount of the tin (II) compound is smaller than 200 parts by weight, the density of the formed image is low and if the amount of the tin (II) compound is larger than 1000 parts by weight, the electric resistance of the recording layer is enhanced and such properties as the mechanical strength, abrasion resistance and peel strength of the recording layer are degraded.

As the substrate that can be used in the present invention, there can be mentioned, for example, ordinary papers composed of cellulose fibers such as tissue paper, art paper and raw paper for a copying sheet, synthetic papers formed from stables and fibrils of synthetic fibers, synthetic papers formed by blowing synthetic resin films, knitted fabrics and woven and non-woven fabrics of natural fibers, regenerated fibers and synthetic fibers, films such as plastic films, matted films, laminated films and metal vacuum-deposited films, metal foils and metal sheets, and glass sheets. A coating composition comprising the above-mentioned tin (II) compound and conducting agent is applied onto a substrate such as mentioned above according to known means to form an electric recording material.

Generally speaking, an electric recording material containing a basic salt of divalent tin or tin (II) hydroxide alone as the reducible color-forming substance has a recording efficiency in the range of from 0.12 to 0.23 $W^{-1}$. This recording efficiency (E) is represented by the following formula:

$$E = (0.7/P) \qquad (2)$$

wherein P stands for a recording electric power (W) necessary for performing recording so that the reflection density of the resulting image is 0.7 as measured by using a Macbeth reflection densitometer (Model RD 100; equipped with a blue filter).

According to the present invention, it was found that (A) a tin (II) compound such as mentioned above, (B) a polyhydric alcohol which is liquid under normal conditions and has a vapor pressure lower than 0.1 mmHg at 20° C., and if desired, (C) an organic sulfur compound having at least one thioamide skeleton are incorporated in an electrically conductive layer, the recording efficiency can be enhanced to at least 0.30 $W^{-1}$, preferably at least 0.90 $W^{-1}$.

In order to improve the recording efficiency (E) significantly, it is important that the polyhydric alcohol (B) should be liquid under normal conditions (20° C. and one atmosphere), and in view of the shelf life of the electric recording material, it is important that the vapor pressure of the polyhydric alcohol (B) should be lower than 0.1 mmHg, especially lower than 0.5 mmHg, as measured at 20° C. Polyhydric alcohols which are solid under normal conditions, such as pentaerythritol, mannitol, sorbitol and glucose, have no effect of improving the recording efficiency (E).

As such polyhydric alcohol, there are preferably employed glycols represented by the following general formula:

$$HO + R^1 - O)_{\overline{n}} H \qquad (3)$$

wherein $R^1$ is an alkylene group having 2 to 10 carbon atoms and n is a number of at least 1 which is selected so that the polyhydric alcohol is liquid under normal conditions, and glycerin and diglycerin. As preferred examples of such glycol, there can be mentioned ethylene glycol, diethylene glycol, triethylene glycol, tetraethylene glycol, polyethylene glycols in which n is 5 or larger (the molecular weight is not higher than 400), propylene glycol, dipropylene glycol, polypropylene glycols in which n is 3 or larger (the molecular weight is not higher than 400), butylene-1,4-glycol, hexylene glycol and octylene glycol.

It is preferred that the polyhydric alcohol (B) be used in such an amount that the mixing weight ratio of the tin (II) compound (A) to the polyhydric alcohol (B), namely the (A):(B) weight ratio, is in the range of from 1:0.05 to 1:0.5, especially from 1:0.1 to 1:0.35. When the amount of the polyhydric alcohol (B) is smaller than the above range, no substantial improvement of the recording efficiency (E) can be expected, and when the amount of the polyhydric alcohol (B) is larger than the above range, the recording current not participating in the improvement of the image density increases and substantial reduction of the recording efficiency is often caused.

In the present invention, if an organic sulfur compound (C) containing at least one thioamide group is incorporated in addition to the polyhydric alcohol (B) into the recording layer containing the tin (II) compound (A), the recording efficiency (E) can be further improved.

Any of organic sulfur compounds satisfying the above requirement and being stable at normal temperatures can be used as the organic sulfur compound (C) in the present invention. In general, it is preferred to use compounds represented by the following general formula:

(4)

wherein $R^2$ and $R^3$, which may be the same or different, stand for a hydrogen atom, a substituted monovalent hydrocarbon group, a heterocyclic group, an acyl group or a substituted or unsubstituted amino group, or $R^2$ and $R^3$ together form an alkylidene group, and $R^4$ stands for a hydrogen atom, a substituted or unsubstituted monovalent hydrocarbon group, a heterocyclic group, a hydroxyl group, a carboxyl group, an alkoxycarbonyl group, a mercapto group or a group (in which $R^2$ and $R^3$ are as defined above).

Preferred examples of compounds represented by the above general formula are as follows:

(1) Thiourea type organic compounds such as thiourea, 1-allyl-2-thiourea ($CH_2=CHCH_2NHCSNH_2$), trimethylthiourea, 1,3-dimethylthiourea, ethylene-thiourea, 1-benzylthiourea, 1-tert-butylthiourea, 1-tert-butyl-3-cyclohexylthiourea, 1-tert-butyl-3-methylthiourea, 1-(cyanomethyl)-1,3-dimethylthiourea, 1,1-dibutyl-3-phenylthiourea, 1,3-dicyclohexylthiourea, 1,3-diethylthiourea, diisopropylthiourea, 1-ethyl-3-(2-hydroxyethyl)thiourea, 1-ethylidene-thiourea, 1-(formylmethyl)-3-phenylthiourea, 1-(2-hydroxyethyl)-3-phenylthiourea, 1-isopropyl-1-methylthiourea, 1-isopropylthiourea, 1-(1-naphthyl)thiourea, 1-(5-nitro-2-propoxyphenyl)thiourea, 1-(phenylsulfonyl)thiourea, 1-phenyl-3-[2-(2-thienyl)-ethyl]thiourea, 1-sulfanylthiourea, 1,1,3-triethylthiourea, 1-(N-acetylsulfanyl)thiourea, 1-allyl-3-(benzylsulfonyl)thiourea, 1-allyl-3-(3,4-dichlorophenyl)thiourea, 1-butyl-3-(p-butylaminophenyl)thiourea, 3-butyl-1,1-dimethylthiourea and 1-acetylthiourea.

(2) Thiosemicarbazide type compounds such as thiosemicarbazide ($NH_2CSNHNH_2$), 1-axetyl-4-benzoylthiosemicarbazide, 4-allylthiosemicarbazide, 4-(2,4-dichlorophenyl)thiosemicarbazide, 4-methylthiosemicarbazide, 4-methyl-1-p-toluylthiosemicarbazide, 1-ethylidene-4-methylthiosemicarbazide, 1-ethylidene-4-methylthiosemicarbazide and 1-ethyl-4-methylthiosemicarbazide.

(3) Thiosemicarbazone type compounds ($R_2C=NNHCSNH_2$) such as acetone-thiosemicarbazone, methylethylketone-thiosemicarbazone, methylisobutylketone-thiosemicarbazone and benzaldehyde-thiosemicarbazone.

(4) Thiocarbazide type compounds such as thiocarbazide ($H_2NHNCSNHNH_2$), 1-phenylthiocarbazide and 1-methyl-1-phenylthiocarbazide.

(5) Thioamide type compounds such as thioformamide, thioacetamide, thiopropionamide, thiostearoamide, thiobenzamide, thioformanilide, thioacetoanilide, thioacetonaphthalide and thiobenzanilide.

(6) Thio-oxamide type compounds such as thio-oxamide.

(7) Other organic sulfur compounds such as hydrazine-bis-thiocarbonamide, hydrazine-bis-thiocarbonanilide, O-ethyl thiocarbanilate, N,N,N′,N′-tetramethylthiuram disulfide, benzyl N-phenyldithiocarbamate, β-cyanoethyl N,N-pentamethylene-dithiocarbamate, methyl N-benzoyldithiocarbazinate and 2,4-dithiobiuret.

Among these organic sulfur compounds, thiourea, ethylene-thiourea and allylthiourea are especially preferred for attaining the objects of the present invention.

It is preferred that the sulfur compound (C) be used in such an amount that the mixing weight ratio of the tin (II) compound (A) to the sulfur compound (C), namely the (A):(C) weight ratio, is in the range of from 1:0.02 to 1:0.4, especially from 1:0.05 to 1:0.3. When the amount of the sulfur compound (C) is smaller than the above range, no substantial improvement of the recording efficiency (E) can be expected, and if the amount of the sulfur compound (C) exceeds the above range, the electric resistance of the recording layer becomes high and substantial reduction of the recording efficiency (E) takes place.

The electrolytic recording material of the present invention can be applied to various types of electric recording processes using a cathode stylus. In accordance with one preferred embodiment of the present invention, the electric recording using the above-mentioned electric recording material is worked according to the following electric recording process; more specifically, an electric recording process comprising electrically connecting an electric recording material comprising a substrate and an electrically conductive recording layer formed on said substrate, said recording layer containing a basic salt of divalent tin or tin (II) hydroxide dispersed in an electrically conductive medium, between a cathode stylus and a counter anode so that the electrically conductive layer falls in contact with the cathode stylus, moving the cathode stylus and the electric recording material relatively to scan the recording cathode stylus over the substantially entire surface of the electrically conductive recording layer, and simultaneously applying electric recording signals between the cathode stylus and the counter anode to form a visible image on the electrically conductive recording layer.

The voltage and electric current that are used for recording are changed depending on the kind of the electrically conductive medium and other factors. In general, according to the present invention, there is attained an advantage that an image having a sufficient density can be obtained by a much smaller electric output than electric outputs customarily used in conventional cathodic reduction recording processes. For example, according to the present invention, an image having a sufficient density can be formed by an electric power of 0.5 to 3 W (at the recording speed of 1.4 m/sec). This is one of characteristic features of the present invention.

The basic tin (II) salt or the tin (II) hydroxide used in the present invention is reduced by the cathodic reduction to metallic tin or lead suboxide having a lower degree of oxidation than that of tin (II) oxide or a mixture thereof, whereby an image having a brown or blackish brown color or a color close to black and being excellent in the contrast is formed. It is believed that the polyhydric alcohol (B) present in the recording layer acts as an assistant for promoting reduction of the tin (II) compound (A) and that the organic sulfur compound (C) forms tin sulfide simultaneously with reduction and this tin sulfide is effective for further increasing the image density.

The recorded image formed on the electric recording material of the present invention may be subjected to various post treatments so as to further improve the contrast or preservability of the image. For example, when the recorded image is exposed to a vapor of ammonia or treated with a chelating agent such as EDTA, the discoloration of the background can be prevented.

The present invention will now be described in detail by reference to the following Examples and Referential Examples that by no means limit the scope of the invention.

REFERENTIAL EXAMPLE 1

In 80 ml of water was dissolved 2 g of NaOH, and while the temperature of the solution was maintained below 20° C. by cooling, a solution of 11.3 g of $SnCl_2.2H_2O$ in 10 ml of water was added little by little to the above solution. The mixture was lightly agitated and subjected to suction filtration. The recovered solid was washed with small amounts of water and alcohol and dried at 40° C. to obtain 4.7 g of a light yellow product. In the above reaction, the molar ratio of $SnCl_2.2H_2O$: NaOH was 1:1.

REFERENTIAL EXAMPLE 2

In the same manner as described in Referential Example 1, 11.3 g of $SnCl_2.2H_2O$ was reacted with 2.8 g of KOH (the molar ratio of the reactants was 1:1) to obtain 4.8 g of a light yellow product.

REFERENTIAL EXAMPLE 3

In the same manner as described in Referential Example 1, 11.3 g of $SnCl_2.2H_2$ was reacted with 5 g of $KHCO_3$ (the molar ratio of the reactants was 1:1) to obtain 4.6 g of a light yellow product.

REFERENTIAL EXAMPLE 4

In the same manner as described in Referential Example 1, 11.3 g of $SnCl_2.2H_2O$ was reacted with 2.6 g of $Na_2CO_3$ (the molar ratio of the reactants was 1:0.5) to obtain 4.2 g of a light yellow product.

REFERENTIAL EXAMPLE 5

In the same manner as described in Referential Example 1, 7 g of $SnBr_2$ was reacted with 1 g of NaOH (the molar ratio of the reactants was 1:1) to obtain 3.5 g of a light yellow product.

REFERENTIAL EXAMPLE 6

In the same manner as described in Referential Example 1, 11.3 g of $SnCl_2.2H_2O$ was reacted with 2.1 g of LiOH (the molar ratio of the reactants was 1:1) to obtain 4.7 g of a light yellow product.

REFERENTIAL EXAMPLE 7

In 100 ml of water was dispersed and dissolved 0.93 g of $Ca(OH)_2$ and a solution of 11.3 g of $SnCl_2.2H_2O$ in 10 ml of water was poured into the above solution at room temperature, and the mixture was agitated for 3 minutes and then subjected to suction filtration. The recovered solid was washed with small amounts of water and alcohol and dried at 40° C. to obtain 2.4 g of a light yellow product. In the above reaction, the molar ratio of $SnCl_2.2H_2O:Ca(OH)_2$ was 1:0.25.

REFERENTIAL EXAMPLE 8

In 300 ml of water was dispersed and dissolved 2.3 g of $3MgCO_3.Mg(OH)_2.3H_2O$ and a solution of 11.3 g of $SnCl_2.2H_2O$ in 10 ml of water was poured into the above solution at room temperature, and the mixture was agitated for 3 minutes and then subjected to suction filtration. The recovered solid was washed with small amounts of water and alcohol and dried at 40° C. The product was white before drying, but it became light yellow after drying. The yield of the product was 5.0 g.

REFERENTIAL EXAMPLE 9

In 200 ml of water was dissolved 5.3 g of $Na_2CO_3$, and a solution of 11.3 g of $SnCl_2.2H_2O$ in 10 ml of water was added dropwise little by little to the above solution at room temperature (the molar ratio of the reactants was 1:1). The formed white precipitate was recovered by suction filtration and air-dried to obtain 7.2 g of a product.

EXAMPLE 1

In a ball mill, 10 parts by weight (all of "parts" given hereinafter are by weight) of the compound obtained in Referential Example 1 was dispersed in and mixed with 4.5 parts of a polymeric electrolyte (Elecond PQ-50B manufactured by Soken Kagaku) and 23 parts of methanol. The resulting composition was coated on an aluminum-laminated paper and dried to obtain a recording material comprising a recording layer having a thickness of 8μ. By using a stylus cathode having a stylus pressure of 10 g, electric recording was performed on the so formed recording material at a recording speed of 1.4 m/sec while a part of the recording surface was pressed by a counter anode. It was found that a brown recorded deemed to be formed as a result of cathodic reduction was present on the recording layer. The relation between the density of the recorded image and the recording electric power is shown by curve a in FIG. 4. The line density adopted at the recording was 13 lines per millimeter.

EXAMPLE 2

In the same manner as described in Example 1, a recording material was prepared by using the compound obtained in Referential Example 2, and the electric recording was carried out in the same manner as described in Example 1. A recorded image having a reflection density of 0.72 was obtained at a recording electric power of 3 W.

EXAMPLES 3 to 5

In a ball mill, 10 parts of the compound obtained in Referential Example 3, 4 or 5 was dispersed in and mixed with 20 parts of a polymeric electrolyte (Chemistat 5101 manufactured by Sanyo Kasei Kogyo) and 25 parts of methanol, and the resulting composition was coated on an aluminum vacuum-deposited paper and dried to form a recording material comprising an electric recording layer having a thickness of 10μ. In the same manner as described in Example 1, the electric recording was carried out at an applied voltage of 150 V by using a stylus cathode. The density of the recorded image is shown in Table 1. In each of recording materials prepared in the same manner as above except that 2 parts of glycerin was added to the above composition, a grayish black image was obtained and the density was heightened by 0.1 to 0.15 over the density obtained when glycerin was not added.

Table 1

| Example No. | Reducible Image-Forming Substance | Reflection Density of Recorded Image | |
|---|---|---|---|
| | | glycerin was not added | glycerin was added |
| 3 | compound obtained in Referential Example 3 | 0.60 | 0.70 |
| 4 | compound obtained in Referential Example 4 | 0.62 | 0.77 |
| 5 | compound obtained in Referential Example 5 | 0.58 | 0.71 |

EXAMPLE 6

In the same manner as described in Example 1, a recording material was prepared by using 10 parts of the compound obtained in Referential Example 6 and 1.5 parts of polyethylene glycol having a molecular weight of about 200. When a recording electric power of 1 W was applied to this recording material in the same manner as described in Example 1, a recorded image having a reflection density of 0.60 was formed.

EXAMPLE 7

In a ball mill, 10 parts of the compound obtained in Referential Example 7, 2 parts of propylene glycol, 2 parts of ethylene-thiourea, 5 parts of a polymeric electrolyte (Elecond PQ-T14 manufactured by Soken Kagaku) and 1.2 parts of another polymeric electrolyte (ECR-34 manufactured by Dow Chemical) were dispersed in and mixed with 35 parts of methanol, and the resulting composition was coated on an aluminum vacuum-deposited paper and dried to form a recording material. The recording material was set at a plate making machine formed by modifying a commercially available automatic machine for forming stencil papers (Gakken Fax manufactured by Gakushu Kenkyusha), and the electric recording was carried out at a recording speed of 2.0 m/sec by using a recording stylus as the cathode. A sharp recorded image free of tailing was obtained.

EXAMPLE 8

In the same manner as described in Example 7, a recording material was prepared by using 10 parts of the compound obtained in Referential Example 8 and 1.5 parts of 1-allyl-2-thiourea and the electric recording was carried out by using this recording material to obtain a recorded image of a half-tone excellent in the reproducibility.

EXAMPLE 9

A coating composition indicated in Table 2 was prepared by using the compound obtained in Referential Example 1 and a recording material was prepared by using this coating composition in the same manner as described in Example 1. Then, the electric recording was carried out by using the so obtained recording material in the same manner as described in Example 1. Obtained results (the relation between the density of the recorded image and the recording electric power) are shown in FIG. 4.

Table 2

Figure 4:
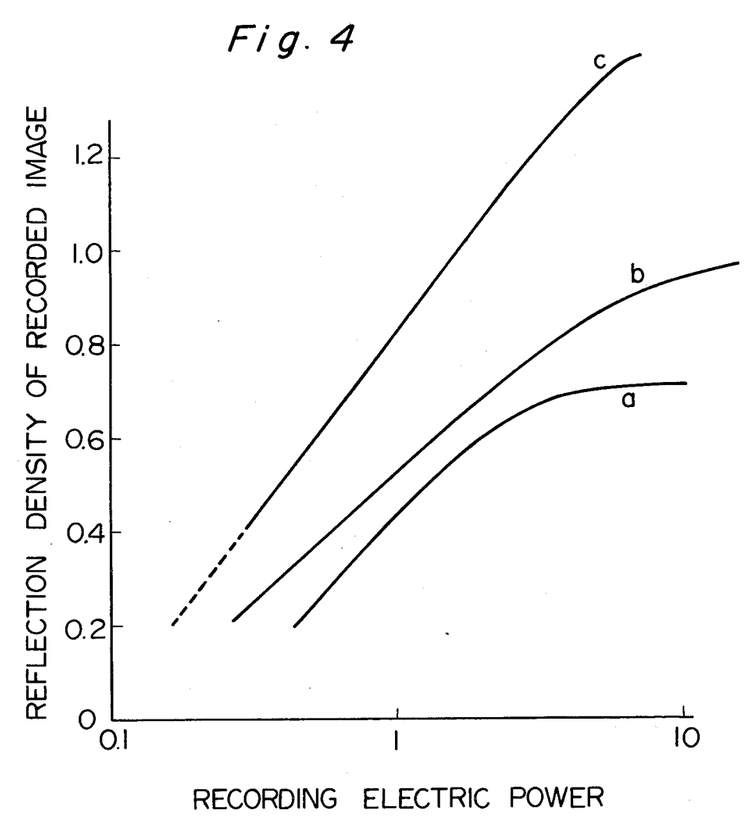
FIG. 4 is a graph illustrating the relation between the recording electric output and the recording density.

| Coating Composition | Amount (parts) of Compound Obtained in Referential Example 1 | Polyhydric Alcohol | | Organic Sulfur Compound (parts) | Curve in FIG. 4 |
|---|---|---|---|---|---|
| | | Kind | Amount (parts) | | |
| B | 10 | ethylene glycol | 2 | — | b |
| C | 10 | glycerin | 1 | thiourea (1) | c |

In case of the coating composition B, the recorded image was grayish black and in case of the coating composition C, the recorded image was blackish brown. Even after these recorded images had been stored for 3 months, no reduction of the image density was observed in each image.

EXAMPLE 10

In the same manner as described in Example 1, a recording material was prepared by using the compound obtained in Referential Example 9 and the electric recording was carried out by using the so prepared recording material. A recorded image having a reflection density of 0.60 was obtained at a recording electric power of 3 W. When this recorded image was exposed to ultraviolet rays, no substantial coloration of the background was observed and the background was kept highly white.

From the results of the foregoing Examples, especially those shown in FIG. 4, it will readily be understood that in the electric recording material of the present invention, since the curve of the density of the recorded image to the recording electric power is substantially linear over a broad range, the recording material is prominently excellent in the gradient characteristic and also excellent in the recording efficiency.

What we claim is:

1. In a dry type electric recording material which comprises a substrate, an electrically conductive layer, and an electrically conductive dry recording layer formed on the surface of said electrically conductive layer, the improvement wherein said electrically conductive dry layer comprises a water-insoluble divalent tin compound dispersed in an electrically conductive polymeric medium, said water-insoluble divalent tin compound being a water-insoluble product having an average particle size not larger than 3μ and being obtained by reacting a tin (II) halide with an alkaline agent in an aqueous solution, the amount of the alkaline agent being 0.2 to 1 equivalent based on the tin (II) halide, said water-insoluble divalent tin compound being present in the electrically conductive dry recording layer in an amount of 200 to 1000 parts by weight per 100 parts by weight of the electrically conductive polymeric medium, said recording layer having a volume resistivity of from $10^3$ to $10^7$ $\Omega$-cm.

2. A dry type electric recording material as set forth in claim 1 wherein said electrically conductive dry layer further comprises a polyhydric alcohol which is liquid under normal conditions and has a vapor pressure lower than 0.1 mmHg at 20° C., said polyhydric alcohol being selected from the group consisting of compounds represented by the following formula:

$$HO \!\!-\!\!(R^1\!\!-\!\!O)_{\overline{n}} H$$

wherein $R^1$ stands for an alkylene group having 2 to 10 carbon atoms and n is a number of at least 1 which is selected to that the polyhydric alcohol, is liquid under normal conditions, glycerin and diglycerin.

3. The electric recording material of claim 1 wherein the alkaline agent is a member selected from the group consisting of the hydroxides, carbonates and bicarbonates of an alkali metal, ammonia, ammonium carbonate and hydroxides, water soluble carbonates and bicarbonates of an alkaline earth metal.

4. The electric recording material of claim 1 wherein the amount of the alkaline agent is from about 0.4 to 0.8 equivalent based on the tin (II) halide.

5. The electric recording material of claim 1 wherein the divalent tin compound is a tin (II) oxychloride.

6. The electric recording material of claim 5 wherein the tin (II) oxychloride is a member selected from the group consisting of:
$SnO.SnCl_2.3H_2O$,
$4SnO.SnCl_2.6H_2O$,
$3SnO.2SnCl_2.6H_2O$,
$5SnO.2SnCl_2.3H_2O$,
$7Sn(OH)_2.2SnCl_2$ and
$3Sn(OH)_2.SnCl_2$.

7. A dry type electric recording material comprising a substrate, an electrically conductive layer and an electrically conductive dry recording layer formed on the surface of the electrically conductive layer, said recording layer containing (A) a water-insoluble divalent tin compound, (B) a polyhydric alcohol which is liquid under normal conditions and has a vapor pressure lower than 0.1 mmHg at 20° C. and (C) an organic sulfur compound having at least one thioamide skeleton, said components (A), (B) and (C) being dispersed in an electrically conductive polymeric medium, said water-insoluble divalent tin compound being a water-insoluble product having an average particle size not larger than $3\mu$ and obtained by reacting a tin (II) halide with an alkaline agent in an aqueous solution, the amount of the alkaline agent being 0.2 to 1 equivalent based on the tin (II) halide, said polyhydric alcohol being selected from the group consisting of compounds represented by the following formula:

$$HO \!\!-\!\!(R^1\!\!-\!\!O)_{\overline{n}} H$$

wherein $R^1$ stands for an alkylene group having 2 to 10 carbon atoms and n is a number of at least 1 which is selected so that the polyhydric alcohol is liquid under normal conditions, glycerin and diglycerin, said organic sulfur compound being a compound represented by the following formula:

wherein $R^2$ and $R^3$, which may be the same or different, stand for a hydrogen atom, a substituted or unsubstituted monovalent hydrocarbon group, a heterocyclic group, an acyl group or a substituted or unsubstituted amino group, or $R^2$ and $R^3$ together form an alkylidene group, and $R^4$ stands for a hydrogen atom, a substituted or unsubstituted monovalent hydrocarbon group, a heterocyclic group, a hydroxyl group, a mercapto group or a group in which $R^2$ and $R^3$ are as defined above, said components (A), (B) and (C) being present in such amounts that the weight ratio of (A):(B):(C) is in the range of from 1:0.05:0.02 to 1:0.5:0.4, said recording layer having a volume resistivity of from $10^3$ to $10^7$ $\Omega$-cm.

8. A dry type electric recording process comprising connecting electrically an electric recording material comprising a substrate, an electrically conductive layer and an electrically conductive dry recording layer formed on said electrically conductive layer between a cathode stylus and a counter anode so that the electrically conductive dry recording layer falls in contact with the cathode stylus, said recording layer comprising a water-insoluble divalent tin compound dispersed in an electrically conductive polymeric medium, said water-insoluble divalent tin compound being a water-insoluble product having an average particle size not larger than $3\mu$ and being obtained by reacting a tin (II) halide with an alkaline agent in an aqueous solution, the amount of the alkaline agent being 0.2 to 1 equivalent based on the tin (II) halide, moving the cathode stylus and the electric recording material relatively to scan the recording cathode stylus over the substantially entire surface of the electrically conductive dry recording layer, and simultaneously applying electric recording signals between the cathode stylus and the counter anode to form a visible image on the electrically conductive recording dry layer by cathodic reduction.

* * * * *

UNITED STATES PATENT AND TRADEMARK OFFICE
CERTIFICATE OF CORRECTION

PATENT NO. : 4,199,413
DATED : April 22, 1980
INVENTOR(S) : Nobuhiro Miyakawa et al.

It is certified that error appears in the above—identified patent and that said Letters Patent is hereby corrected as shown below:

On the cover page item (30) should read

-- Feb. 19, 1976    Japan    51/16514 --.

Signed and Sealed this

Third Day of February 1981

[SEAL]

Attest:

RENE D. TEGTMEYER

Attesting Officer    Acting Commissioner of Patents and Trademarks